(12) United States Patent
Sturgin et al.

(10) Patent No.: US 9,777,781 B2
(45) Date of Patent: Oct. 3, 2017

(54) ROTARY ACTUATED CLUTCH

(71) Applicant: Schaeffler Technologies AG & Co. KG, Herzogenaurach (DE)

(72) Inventors: Todd J. Sturgin, Wooster, OH (US); Philip George, Wooster, OH (US)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 91 days.

(21) Appl. No.: 14/922,688

(22) Filed: Oct. 26, 2015

(65) Prior Publication Data

US 2017/0114841 A1    Apr. 27, 2017

(51) Int. Cl.

| | | |
|---|---|---|
| *F16D 41/02* | (2006.01) | |
| *F16D 41/064* | (2006.01) | |
| *F16D 127/06* | (2012.01) | |
| *F16D 11/14* | (2006.01) | |
| *F16D 67/00* | (2006.01) | |
| *F16D 67/02* | (2006.01) | |
| *F16D 23/12* | (2006.01) | |

(52) U.S. Cl.
CPC .............. *F16D 41/02* (2013.01); *F16D 11/14* (2013.01); *F16D 41/064* (2013.01); *F16D 67/00* (2013.01); *F16D 67/02* (2013.01); *F16D 2023/123* (2013.01); *F16D 2127/06* (2013.01)

(58) Field of Classification Search
CPC .......... F16D 41/02; F16D 11/16; F16D 19/00; F16D 41/064
USPC ..................................................... 192/45.005
See application file for complete search history.

(56) References Cited

U.S. PATENT DOCUMENTS

| | | | |
|---|---|---|---|
| 6,464,061 B1* | 10/2002 | Inoue ...................... | F16D 7/028 188/134 |
| 2009/0277726 A1* | 11/2009 | Wasser ................... | F16D 67/00 188/71.2 |
| 2014/0062237 A1 | 3/2014 | Riegler | |

* cited by examiner

*Primary Examiner* — Jacob S Scott
*Assistant Examiner* — Timothy M Hannon
(74) *Attorney, Agent, or Firm* — Chester Paul Maliszewski

(57) ABSTRACT

A rotary actuated clutch, comprising an axis of rotation, a housing, an input hub, an intermediate hub, and an output hub. For a first locked mode, the intermediate hub and the output hub are non-rotatably connected to the housing, and for a torque-transmitting mode the input hub is arranged to receive torque in a first circumferential direction, the input hub is arranged to rotate in the first circumferential direction to disengage the intermediate hub from the housing, and the intermediate hub is arranged to rotate the output hub in the first circumferential direction.

17 Claims, 9 Drawing Sheets

ROTARY ACTUATED CLUTCH

TECHNICAL FIELD

The present disclosure relates to a rotary activated clutch. In particular, to a rotary activated clutch which uses rotary motion to open and close the clutch and transmits the rotary motion when closed, for example to the rear steering rack of a motor vehicle.

BACKGROUND

It is known to use clutch and rotary devices within automobiles to assist with steering applications. The known device include complicated hydraulic systems and rotational controls. Typically, an actuator is required to axially disengage a clutch plate to enable rotation for steering, and a secondary motor is used to apply a rotation force in order to execute the steering.

SUMMARY

According to aspects illustrated herein, there is provided a rotary actuated clutch, including: an axis of rotation; a housing, an input hub; an intermediate hub; and an output hub. For a first locked mode, the intermediate hub and the output hub are non-rotatably connected to the housing. For a torque-transmitting mode the input hub is arranged to receive torque in a first circumferential direction, the input hub is arranged to rotate in the first circumferential direction to disengage the intermediate hub from the housing, and the intermediate hub is arranged to rotate the output hub in the first circumferential direction.

According to aspects illustrated herein, there is provided a rotary actuated clutch, including: an axis of rotation; a housing including a first locking surface; an input hub; an intermediate hub including a second locking surface; and an output hub non-rotatably connected to the intermediate hub. In a first locked mode, the first and second pluralities of locking features are non-rotatably connected to each other. In a torque transmitting mode: the input hub is arranged to rotate in a first circumferential direction and displace the intermediate hub in a first axial direction; the second locking surface is arranged to disengage from the first locking surface; and the output hub is non-rotatably connected to the input hub. In a second locked mode, while in the torque transmitting mode, the first hub is arranged to rotate further in the first circumferential direction by a predetermined distance, and the second locking surface is arranged to non-rotatably connect to the first locking surface.

According to aspects illustrated herein, there is provided a rotary actuated clutch, including: an axis of rotation; a housing including a first locking surface; an input hub; an intermediate hub including a second locking surface; and an output hub non-rotatably connected to the intermediate hub. In a first locked mode, the intermediate and output hubs are non-rotatably connected to the housing. In a torque transmitting mode: the input hub is arranged to rotate in a first circumferential direction and displace the intermediate hub in a first axial direction; the second locking surface is arranged to disengage from the first locking surface; and the input hub is non-rotatably connected to the output hub. To return to the first locked mode from the torque transmitting mode: the first hub is arranged to rotate in a second circumferential direction, opposite the first circumferential direction; the intermediate hub is arranged is displace in a second axial direction, opposite the first axial direction; and the second locking surface is arranged to non-rotatably connect to the first locking surface.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Unless defined otherwise, all technical and scientific terms used herein have the same meaning as commonly understood to one of ordinary skill in the art to which this present disclosure belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

Figure 1:
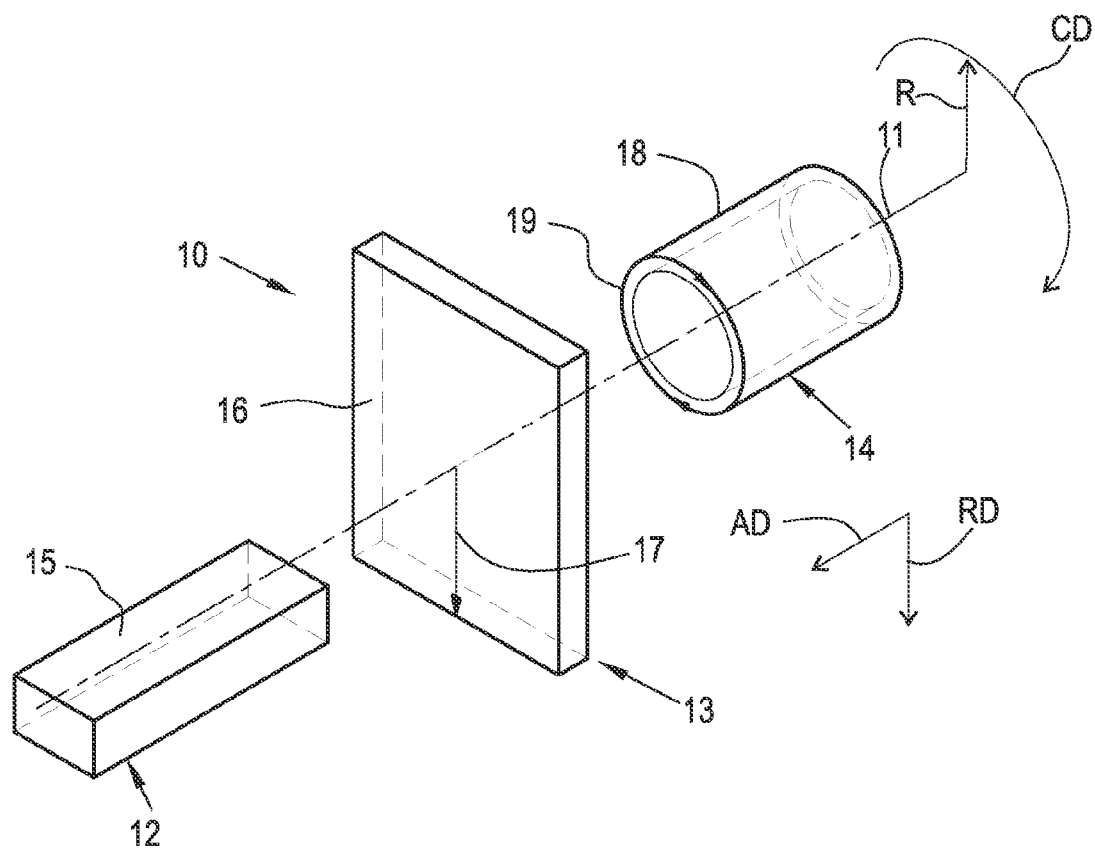
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
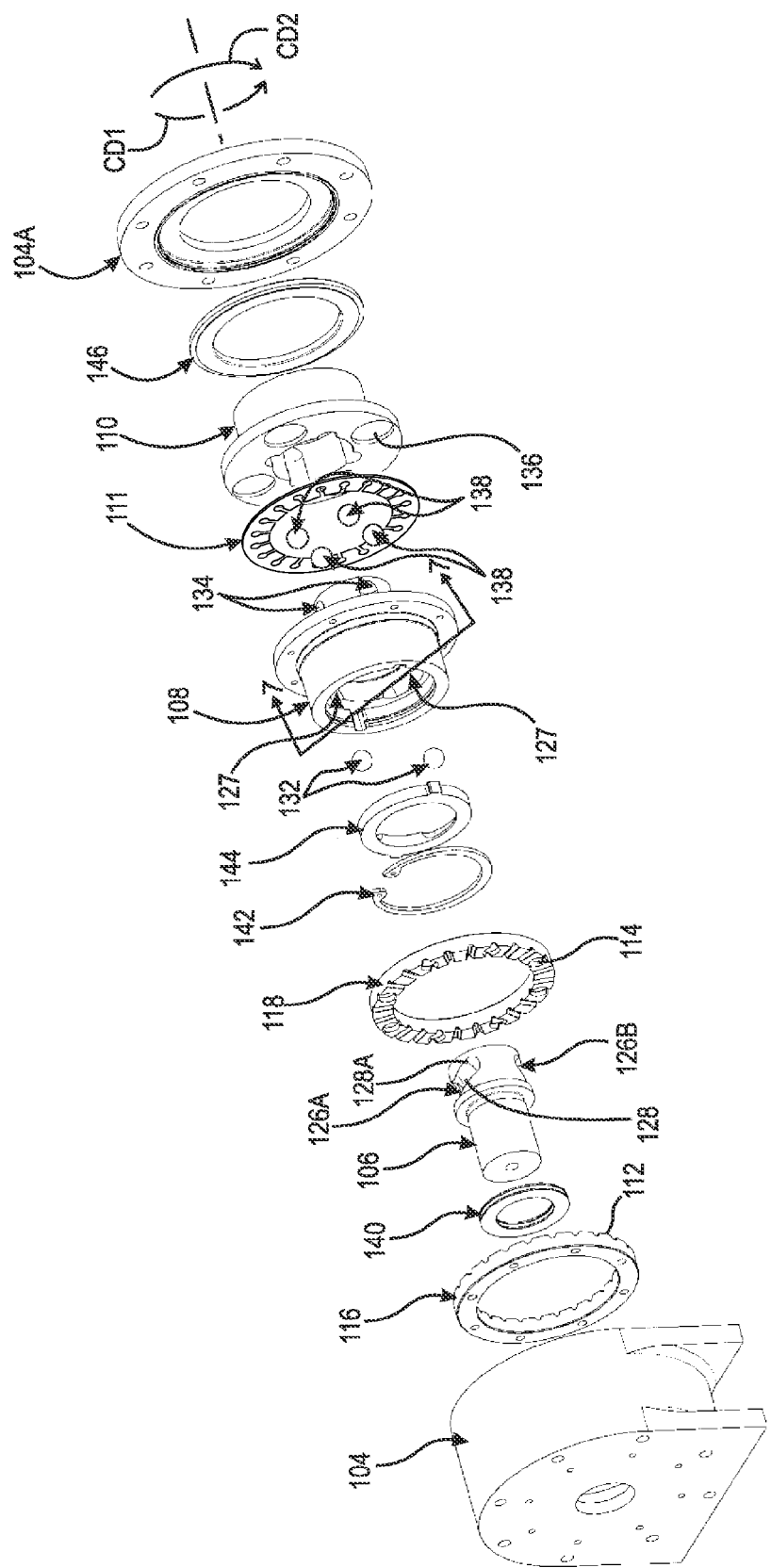
FIG. 2 is an exploded perspective view of a rotary actuated clutch.

FIG. 2 is an exploded perspective view of rotary actuated clutch 100.

Figure 3:
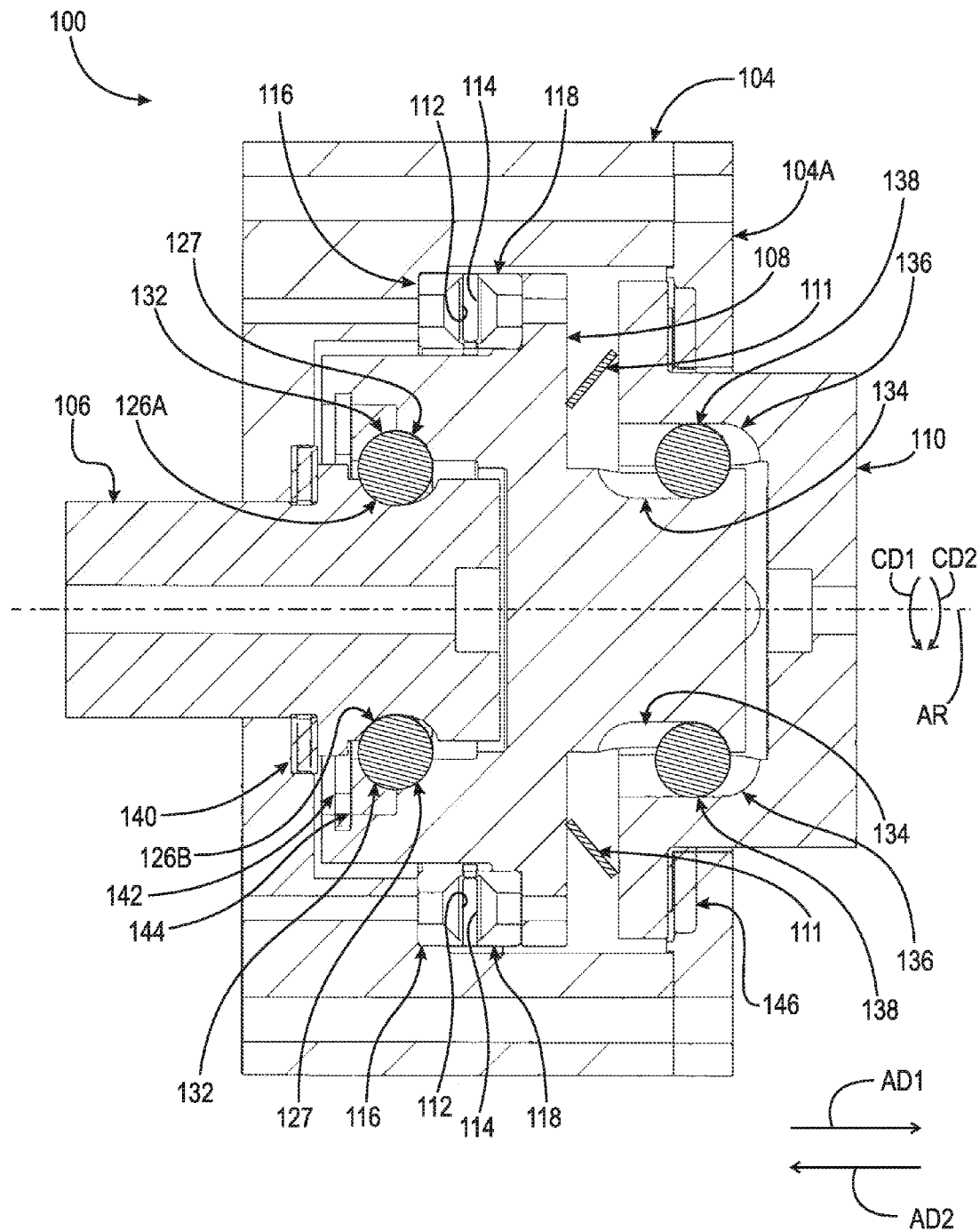
FIG. 3 is a cross-sectional view of the rotary actuated clutch shown in FIG. 2 in a locked mode.

FIG. 3 is a cross-sectional view of the rotary actuated clutch 100 shown in FIG. 2 in a locked mode.

Figure 4:
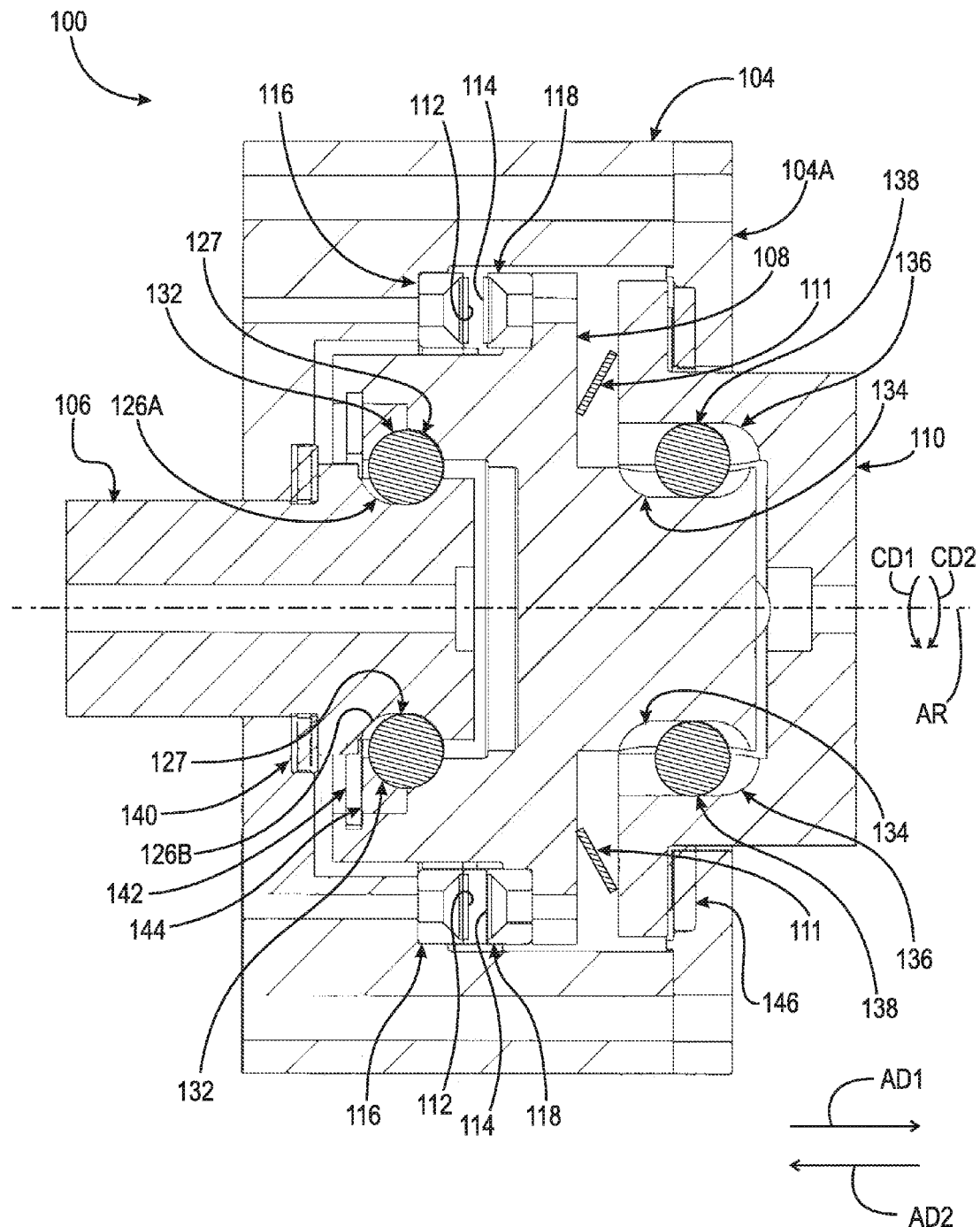
FIG. 4 is a cross-sectional view of the rotary actuated clutch shown in FIG. 2 in an torque-transmitting mode.

FIG. 4 is a cross-sectional view of rotary actuated clutch 100 in a torque-transmitting mode. Rotary actuated clutch 100 includes axis of rotation AR, housing 104, input hub 106, intermediate hub 108, and output hub 110. For a first locked mode, intermediate hub 108 and output hub 110 are non-rotatably connected to housing 104. For a torque-transmitting mode, input hub 106 is arranged to receive torque in circumferential direction CD1 or CD2, opposite CD1. The discussion that follows assumes that torque is initially received in direction CD1 unless stated otherwise; however, it should be understood that the initial torque could be received in direction CD2. To initiate the torque-transmitting mode, input hub 106 is arranged to rotate in circumferential direction CD1 to disengage intermediate hub 108 from housing 104; and intermediate hub 108 is arranged to rotate output hub 110 in circumferential direction CD1. By "non-rotatably connected" elements, we mean that: the elements are connected so that whenever one of the elements rotates, all the elements rotate; and relative rotation between the elements is not possible. Radial and/or axial movement of non-rotatably connected elements with respect to each other is possible, but not required.

For the torque-transmitting mode, for example, actively steering a vehicle, input hub 106 is arranged to displace intermediate hub 108 in axial direction AD1, and non-rotatably connect to intermediate hub 108. As noted above, for the torque-transmitting mode: input hub 106 is arranged to receive torque in either of directions CD1 or CD2; and as further described below, intermediate hub 108 is arranged to rotate output hub 110 in either of circumferential directions CD2 or CD1, respectively.

In an example embodiment, clutch 100 includes spring element 111 axially arranged between intermediate hub 108 and output hub 110. Spring element 111 applies a force to intermediate hub 108 in axial direction AD2. Housing 104 includes locking features 112 and intermediate hub 106 includes locking features 114. Locking features 112 and 114 are arranged on locking rings 116 and 118, respectively. Locking ring 116 is non-rotatably connected to housing 104 and locking ring 118 is non-rotatably connected to intermediate hub 108.

Figure 5:
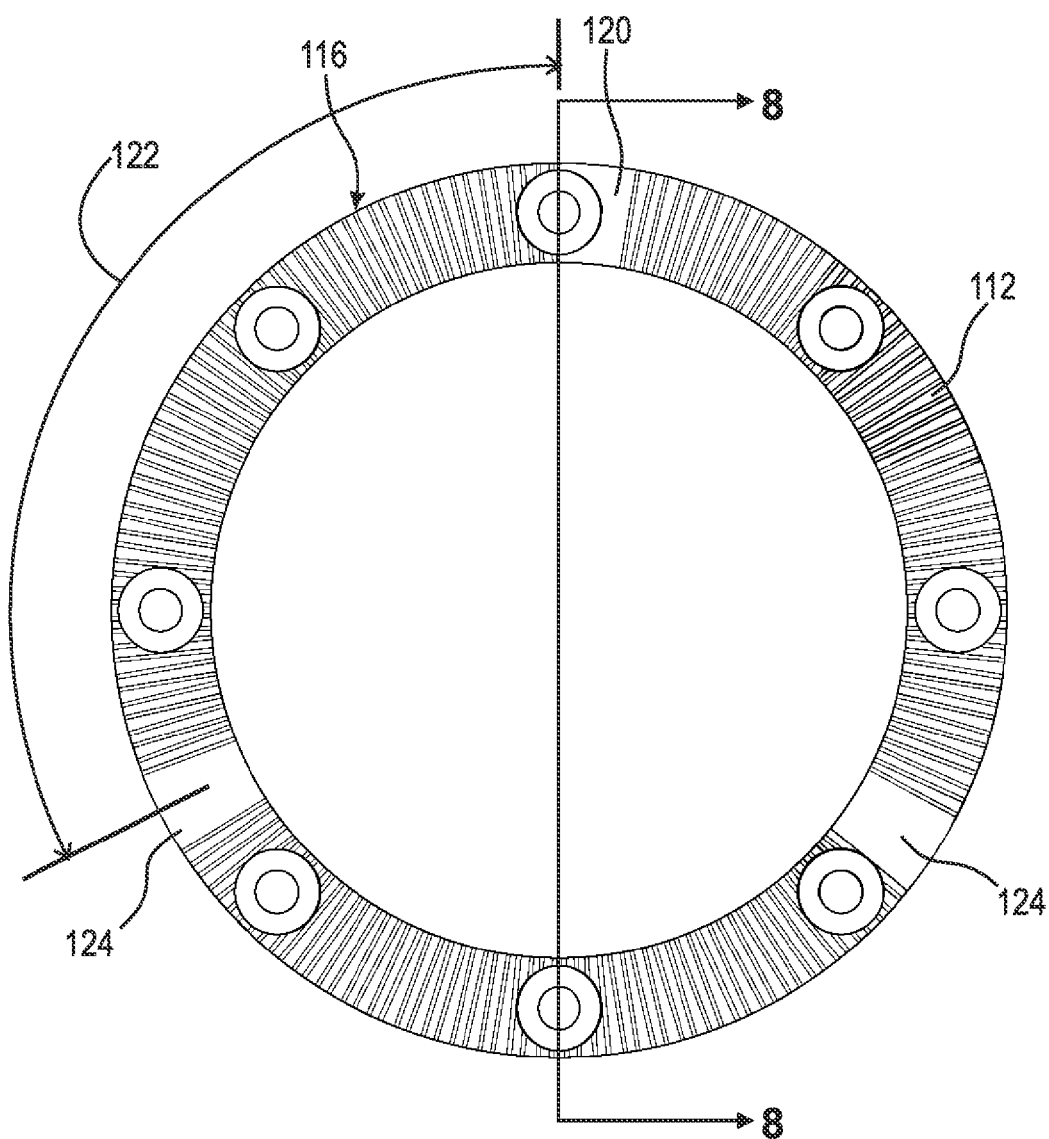
FIG. 5 is a front view of the locking ring shown in FIG. 2.

FIG. 5 is a front view of locking ring 116 shown in FIG. 2. In the first locked mode, for example steering a vehicle in a straight line, input hub 106 is in a particular circumferential position with respect to the housing, for example, at 12 o'clock or zero degree position 120 for ring 116 shown in FIG. 5. In the above example, for rotary actuated clutch 100 to return to the first locked mode from the torque-transmitting mode: input hub 106 is arranged to receive torque in circumferential direction CD2; spring element 111 is arranged to displace intermediate hub 108 in axial direction AD2, with respect to hub 110; and input hub 106, intermediate hub 108, and output hub 110 are arranged to rotate in circumferential direction CD2 until locking features 114 are non-rotatably connected to locking features 112. In the current example, locking features 112 and 114 non-rotatably connect when hub 106 is in the zero degree position.

In an example embodiment, for the torque-transmitting mode, locking features 114 are in contact with locking features 112 and are arranged to displace in circumferential direction CD1 or CD2 with respect to locking features 112. For example, features 114 slide across features 112 without non-rotatably connecting to features 112. For the torque-transmitting mode, input hub 106 can receive torque alternating in directions CD1 and CD2 and input hub is arranged to rotate output hub 110 in the alternating directions.

As noted above, from the zero degree position, input hub 106 can receive torque in direction CD2. As described above, hub 106 displaces hub 108 in direction AD1 and input hub 106 rotates intermediate hub 108 and output hub 110 in direction CD2. To return to the zero degree position, input hub 106 receives torque in direction CD1 and intermediate hub 108 rotates in direction CD1 until input hub 106 is in the zero degree position and locking features 112 and 114 non-rotatably connect. As noted above, for the torque-transmitting mode, input hub 106 can receive torque alternating in directions CD1 and CD2 and input hub is arranged to rotate output hub 110 in the alternating directions.

For a second locked mode, for example locking steering at a maximum turning point, for example, after input hub 106 received torque in direction CD1 and while clutch 100 is in the torque-transmitting mode, input hub 106 is arranged to rotate intermediate hub 108 in circumferential direction CD1 by predetermined amount 122 to position 124 of ring 116 shown in FIG. 5. Once rotated by amount 122, locking features 112 and 114 are arranged to non-rotatably connect intermediate hub 108 and output hub 110 to housing 104. Note that the preceding discussion is applicable to the instance in which input hub receives torque in direction CD2 from position 120, except the predetermined amount is in direction CD2.

Figure 6A:
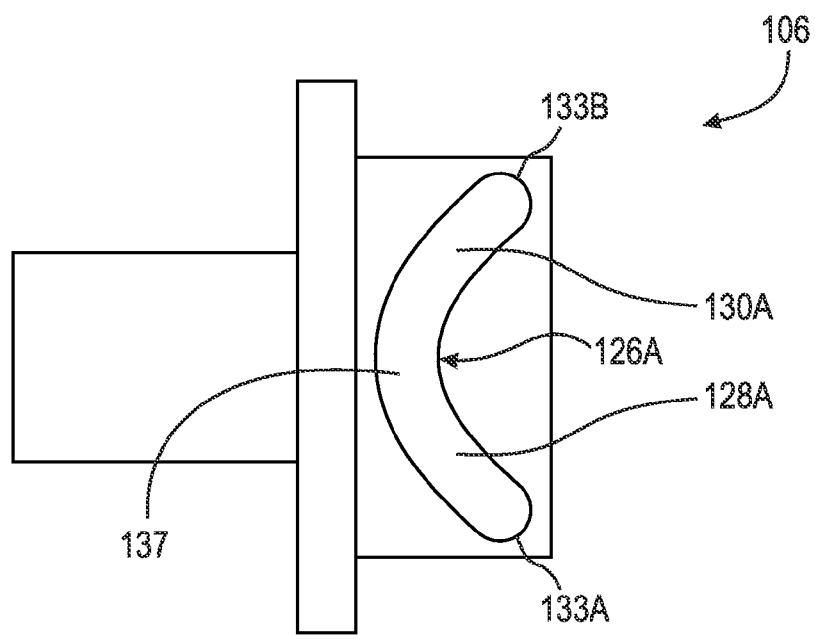
FIG. 6A is a top view of the input hub shown in FIG. 2.

FIG. 6A is a top view of input hub 106 shown in FIG. 2.

Figure 6B:
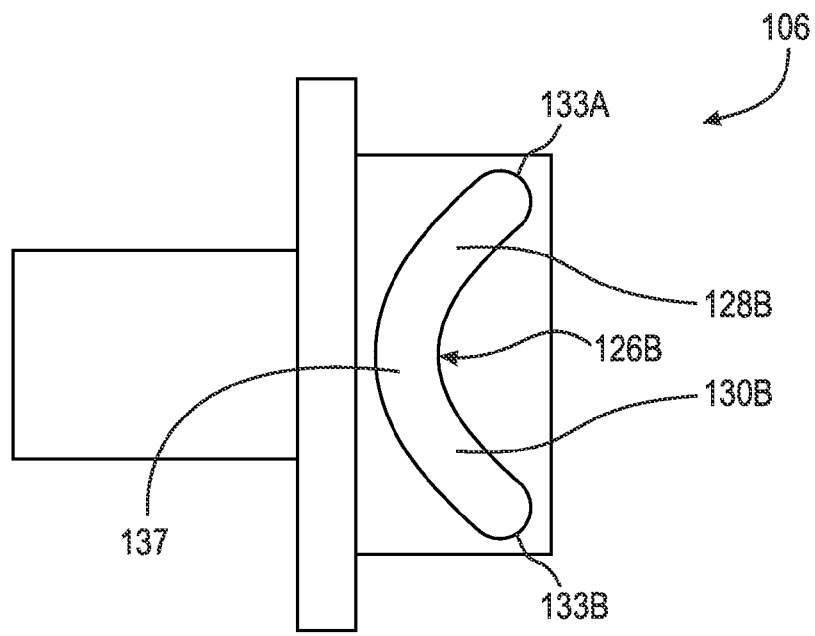
FIG. 6B is a bottom view of the input hub shown in FIG. 2.

FIG. 6B is a bottom view of input hub 106 in FIG. 2.

Figure 7:
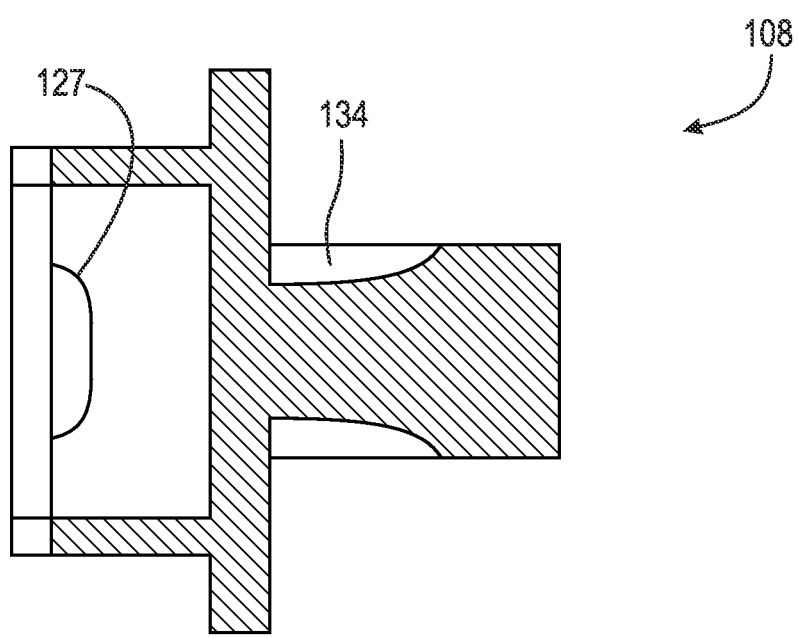
FIG. 7 is a cross-sectional view of the intermediate hub taken generally along line 7-7 in FIG. 2.

FIG. 7 is a cross-sectional view of hub 108 taken generally along line 7-7 in FIG. 2. In an example embodiment, input hub 106 includes V-shaped grooves 126A and 126B. Groove 126A includes legs 128A and 130A extending in axial direction AD1 and in circumferential directions CD2 and CD1, respectively. Groove 126B includes legs 128B and 130B extending in axial direction AD1 and in circumferential directions CD2 and CD1, respectively. In an example embodiment, intermediate hub 108 includes grooves 127; and balls 132 disposed in respective V-shaped grooves 126A and 126B and in respective grooves 137.

To initiate the torque-transmitting mode, the rotation of input hub 106 in circumferential direction CD1 is arranged to displace balls 132 in legs 128A and 128B in circumferential and axial directions CD2 and AD1, respectively. The displacement of balls 132 in circumferential and axial directions CD2 and AD1, respectively, is arranged to displace intermediate hub 108 in axial direction AD1 to enable rotation of intermediate hub 108 with respect to housing 104. In particular, hub 106 is axially fixed, and as balls 132 displace in direction AD1, hub 108 reacts against the balls to displace in direction AD1 relative hub to 106. For initiation of the torque-transmitting mode, from position 120, with torque in direction CD2, as balls 132 displace in directions CD1 and AD1, hub 108 reacts against the balls to displace in direction AD1 relative hub to 106.

Legs 128A and 128B include respective ends 133A extending furthest in circumferential and axial directions CD2 and AD1, respectively. For the torque-transmitting mode initiated with torque in direction CD1, balls 132 are arranged to contact ends 133A. Contact of balls 132 with ends 133A is arranged to rotate intermediate hub 108 in circumferential direction CD1. For example, displacement of balls 132 further in direction CD2 is blocked by ends 133A and balls 132 are forced to rotate in direction CD1 with the input hub. Legs 130A and 130B include respective ends 133B extending furthest in circumferential and axial directions CD1 and AD1, respectively. For initiation of the torque-transmitting mode, from position 120, with torque in direction CD2, balls 132 displace in legs 130A and 130B in directions CD1 and AD1: to displace hub 108 in direction AD1; and to engage ends 133B to rotate hub 108 in direction CD2.

In an example embodiment: intermediate hub 108 includes grooves 134 extending in axial direction AD1; output hub 110 includes indents 136 facing in axial direction AD2; and rotary actuated clutch 100 includes balls 138 disposed in respective grooves 134 and indents 136, enabling axial displacement of intermediate hub 108 with respect to output hub 110 while non-rotatably connecting intermediate hub 108 and input hub 106. That is, grooves 134 and indent 136 rotationally restrain balls 138 while enabling axial displacement of the balls.

For the first locked position, balls 132 are located at junctures 137 in grooves 126A and 126B. To return to the first locked mode from the torque-transmitting mode, input hub 106 is arranged to rotate in circumferential direction CD1 or CD2 as described above, and balls 132 are arranged to displace in axial direction AD2 and circumferential directions CD1 or CD2 within legs 126A and 126B to return to junctures 137.

Figure 8:
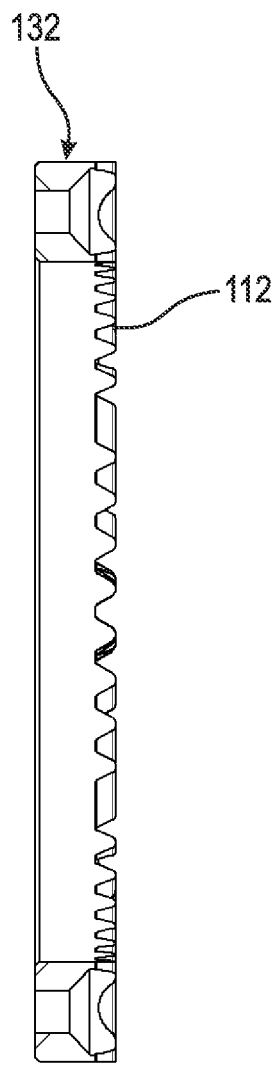
FIG. 8 is a cross-sectional view of the locking ring shown in FIG. 5 taken generally along line 8-8 in FIG. 5.

FIG. 8 is a cross-sectional view of the locking ring shown in FIG. 5 taken generally along line 8-8 in FIG. 5. As noted above, for the torque-transmitting mode, locking elements 114 are arranged to slide along locking elements 112 without non-rotatably connecting to locking elements 112. For example, when positions 120 and 124 for ring 118 are aligned (in the first and second locked modes described above) with positions 120 or 124 for ring 116, features 112 and 114, for example, complimentary teeth, are able to engage with each other as spring 111 pushes hub 108 in direction AD2. However, in the torque-transmitting mode, respective positions 120 and 124 for rings 116 and 118 are not-aligned and features 112 and 114 cannot engage.

Rotary actuated clutch further includes thrust washer 140, snap ring 142, retaining ring 144, and thrust washer 146. Thrust washer 140 enables relative motion between housing 104 and input hub 106 while transferring an axial load from spring element 130. Retaining ring 144 retains balls 132 in grooves 128B and 130B of intermediate hub 108. Snap ring 142 axially secures retaining ring 144 relative to intermediate hub 108. Thrust washer 146 enables relative motion between housing cap 104A and output hub 110 while transferring an axial load from spring element 130.

Figure 9:
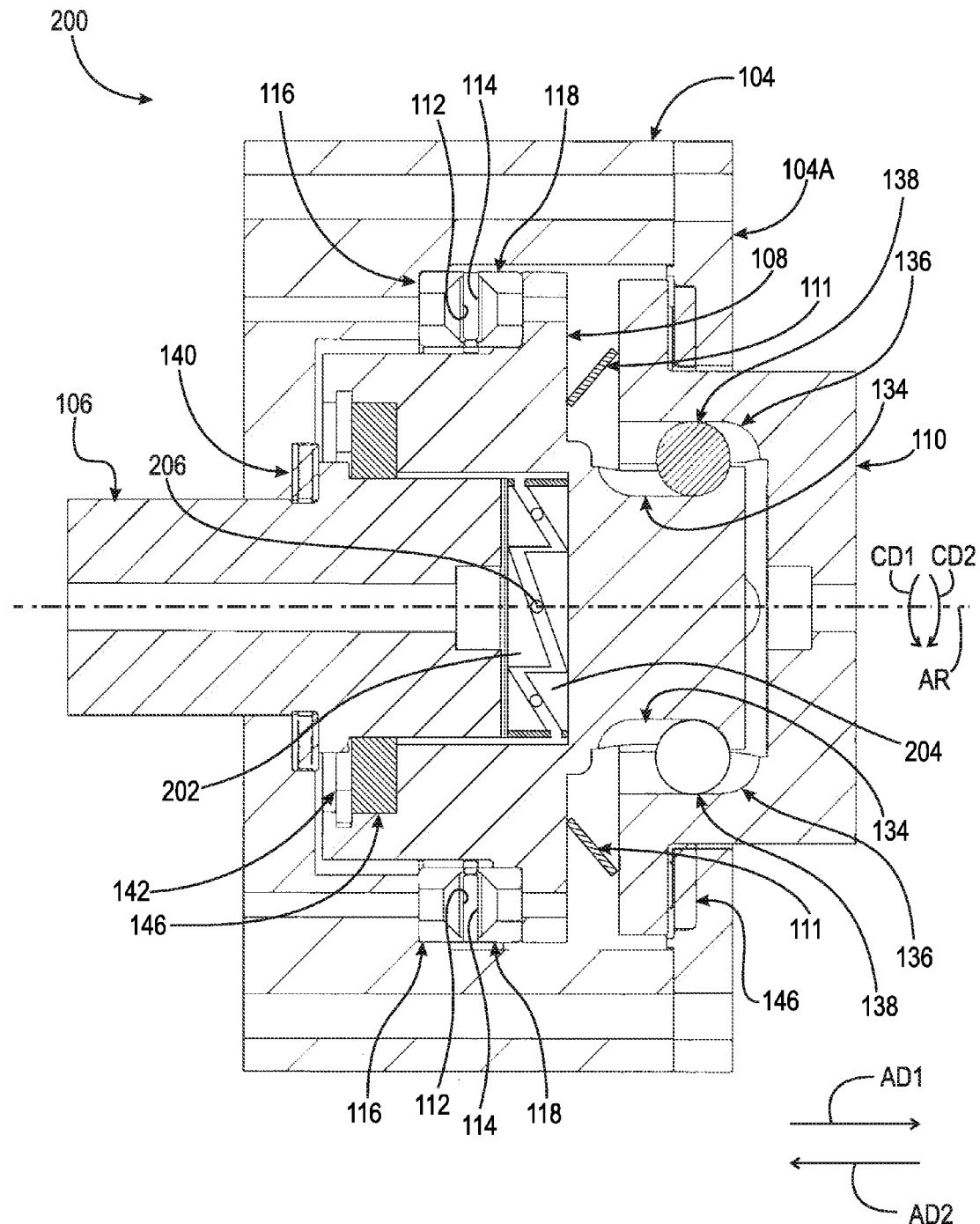
FIG. 9 is a cross-sectional view of a rotary actuated clutch in a locked mode.

FIG. 9 is a cross-sectional view of rotary actuated clutch 200 in an locked mode. The discussion regarding clutch 100 in FIGS. 2 through 8 is applicable to clutch 200 in FIG. 9 except as noted. In place of grooves 126A, 126B, and 137, and balls 132, input hub 106 includes ramps 202 and intermediate hub 108 includes ramps 204. Balls 206 are arranged between ramps 202 and 204. Ramps 202 slope in direction AD2 along direction CD1 and ramps 204 slope in direction AD1 in direction CD2. As noted above, to initiate the torque transmitting mode from the first locked mode: input hub 106 is arranged to receive torque in direction CD1 or CD2 and rotate in direction CD1 or CD2 to disengage intermediate hub 108 from housing 104; and intermediate hub 108 is arranged to rotate output hub 110 in the circumferential direction CD1 or CD2. The interaction of balls 206 and ramps 202 and 204 disengage hub 108 from housing 104 and rotate hub 108 with hub 106.

For example, for initial torque in direction CD1, ramps 202 rotate in direction CD1, forcing balls 206 to ride up ramps 202 in direction CD2. Hub 106 is axially fixed, and as balls 206 ride up ramps 202 in direction CD2, balls 206 are displaced in direction AD1. Ramps 204 and hub 108 react against balls 206 to displace in direction AD1. For example, for initial torque in direction CD2, ramps 202 rotate in direction CD2, forcing balls 206 to ride up ramps 202 in directions CD1. Hub 106 is axially fixed, and as balls 206 ride up ramps 202 in direction CD1, balls 206 are displaced in direction AD1. Ramps 204 and hub 108 reacts against balls 206 to displace in direction AD1.

Advantageously, clutches 100 and 200 use rotational torque, applied to the input hub, to open and close the clutches, and when open, clutches 100 and 200 transmit the same rotational torque to an output hub. Thus, clutches 100 and 200 do not include or require the axial actuator described above to open and close the clutches. As a result, the cost, complexity, parts count, and size of clutches 100 and 200 is reduced and the operation of clutches 100 and 200 is simplified, increasing the reliability of the clutches.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:
1. A rotary actuated clutch, comprising:
an axis of rotation;
a housing;
an input hub;
an intermediate hub; and,
an output hub, wherein:
for a first locked mode, the intermediate hub and the output hub are non-rotatably connected to the housing;

for a torque-transmitting mode:
the input hub is arranged to receive torque in a first circumferential direction;
the input hub is arranged to rotate in the first circumferential direction to disengage the intermediate hub from the housing; and,
the intermediate hub is arranged to rotate the output hub in the first circumferential direction; and,
for a second locked mode and while in the torque-transmitting mode:
the input hub is arranged to rotate the intermediate hub in the first circumferential direction by a first predetermined amount; and,
the intermediate hub and the output hub are arranged to non-rotatably connect to the housing.

2. The rotary actuated clutch of claim 1, wherein for the torque-transmitting mode, the input hub is arranged to:
displace the intermediate hub in a first axial direction; and,
non-rotatably connect to the intermediate hub.

3. The rotary actuated clutch of claim 1, wherein for the torque-transmitting mode:
the input hub is arranged to receive torque in a second circumferential direction, opposite the first circumferential direction; and,
the intermediate hub is arranged to rotate the output hub in the second circumferential direction.

4. The rotary actuated clutch of claim 1, wherein:
the housing includes a first plurality of locking features;
the intermediate hub includes a second plurality of locking features; and,
to return to the first locked mode from the torque-transmitting mode:
the input hub is arranged to receive torque in a second circumferential direction, opposite the first circumferential direction;
the intermediate hub is arranged to displace in an axial direction; and,
the second plurality of locking features is arranged to non-rotatably connect to the first plurality of locking features.

5. The rotary actuated clutch of claim 1, wherein:
for the first locked mode, the input hub is in a first circumferential position with respect to the housing; and,
for the torque-transmitting mode the input hub is arranged to rotate from the first circumferential position in the first circumferential direction.

6. The rotary actuated clutch of claim 1, wherein:
for the first locked mode, the input hub is in a first circumferential position with respect to the housing; and,
for the torque-transmitting mode:
the input hub is arranged to receive torque in a second circumferential direction, opposite the first circumferential direction;
the input hub is arranged to rotate in the second circumferential direction to disengage the intermediate hub from the housing; and,
the intermediate hub is arranged to rotate the output hub in the second circumferential direction.

7. The rotary actuated clutch of claim 1, wherein:
for the first locked mode, the input hub is in a first circumferential position with respect to the housing; and,
to return to the first locked mode from the torque-transmitting mode:
the input hub is arranged to receive torque in a second circumferential direction, opposite the first circumferential direction; and,
and the input hub, the intermediate hub and the output hub are arranged to rotate in the second circumferential direction until the input hub is in the first circumferential position.

8. The rotary actuated clutch of claim 1, wherein:
the housing includes a first plurality of locking features,
the intermediate hub includes a second plurality of locking features;
for the first locked mode, the first and second pluralities of locking features are non-rotatably connected; and,
for the torque-transmitting mode, the second plurality of locking features is in contact with the first plurality of locking features and is arranged to displace in the first circumferential direction with respect to the first plurality of locking features.

9. The rotary actuated clutch of claim 1, wherein:
the input hub includes a V-shaped groove with first and second legs extending in a first axial direction from the input hub toward the output hub, the rotary actuated clutch further comprising:
a ball disposed in the V-shaped groove and in contact with the intermediate hub, wherein for the torque-transmitting mode:
the rotation of the input hub in the first circumferential direction is arranged to displace the ball in the first leg in the first circumferential and axial directions; and,
the displacement of the ball in the first circumferential and axial directions is arranged to displace the intermediate hub in the first axial direction to enable rotation of the intermediate hub with respect to the housing.

10. The rotary actuated clutch of claim 9, wherein:
the first leg includes a first end extending furthest in the first circumferential and axial directions;
for the torque-transmitting mode the ball is arranged to contact the first end; and,
contact of the ball with the first end is arranged to rotate the intermediate hub in the first circumferential direction.

11. The rotary actuated clutch of claim 1, wherein:
the intermediate hub includes a groove extending in a first axial direction from the input hub toward the output hub; and,
the output hub includes an indent facing in a second axial direction opposite the first axial direction, the rotary actuated clutch further comprising:
a ball:
disposed in the groove and the indent; and,
enabling axial displacement of the intermediate hub with respect to the output hub while non-rotatably connecting the intermediate and input hubs.

12. A rotary actuated clutch, comprising:
an axis of rotation;
a housing including a first locking feature;
an input hub;
an intermediate hub including a second locking feature; and,
an output hub non-rotatably connected to the intermediate hub, wherein:
in a first locked mode, the first and second locking features are non-rotatably connected to each other;

in a torque-transmitting mode:
  the input hub is arranged to:
    rotate in a first circumferential direction; and,
    displace the intermediate hub in a first axial direction;
  the second locking feature is arranged to disengage from the first locking feature; and,
  the output hub is non-rotatably connected to the input hub; and,
in a second locked mode, while in the torque transmitting mode:
  the first hub is arranged to rotate further in the first circumferential direction by a predetermined distance; and,
  the second locking feature is arranged to non-rotatably connect to the first locking feature.

13. The rotary actuated clutch of claim 12, wherein:
in the first locked mode, the input hub is in a first circumferential position with respect to the housing; and,
to return to the first locked mode from the second locked mode:
  the input hub is arranged to receive torque in a second circumferential direction, opposite the first circumferential direction; and,
  the input hub and the intermediate hub are arranged to rotate in the second circumferential direction until the input hub is in the first circumferential position.

14. A rotary actuated clutch, comprising:
an axis of rotation;
a housing including a first locking feature;
an input hub;
an intermediate hub including a second locking feature; and,
an output hub non-rotatably connected to the intermediate hub, wherein:
  in a first locked mode, the intermediate and output hubs are non-rotatably connected to the housing;
  in a torque-transmitting mode:
    the input hub is arranged to:
      rotate in a first circumferential direction; and,
      displace the intermediate hub in a first axial direction;
    the second locking feature is arranged to disengage from the first locking feature; and,
    the input hub is non-rotatably connected to the output hub;
  to return to the first locked mode from the torque-transmitting mode:
    the first hub is arranged to rotate in a second circumferential direction, opposite the first circumferential direction;
    the intermediate hub is arranged is displace in a second axial direction, opposite the first axial direction; and,
    the second locking feature is arranged to non-rotatably connect to the first locking feature; and,
  for a second locked mode and while in the torque-transmitting mode:
    the input hub is arranged to rotate the intermediate hub in the first circumferential direction by a first predetermined amount and,
    the first and second locking features are arranged to non-rotatably connect.

15. The rotary actuated clutch of claim 14, wherein the input hub includes:
a V-shaped groove with first and second legs extending in the first axial direction, the rotary actuated clutch further comprising:
  a ball located in the first or second leg, wherein:
    for the first locked position, the ball is located at a juncture of the first and second legs; and,
    for the torque-transmitting mode, the ball is arranged to displace in the second leg to displace the intermediate hub in the first axial direction.

16. The rotary actuated clutch of claim 15, wherein to return to the first locked mode from the torque-transmitting mode:
  the input hub is arranged to rotate in the second circumferential direction;
  the ball is arranged to displace in the second axial and circumferential directions within the second groove;
  the intermediate hub is arranged to displace in the second axial direction; and,
  the second locking feature is arranged to non-rotatably connect to the first locking feature.

17. The rotary actuated clutch of claim 14, wherein in the torque-transmitting mode:
  the input hub is arranged to receive torque in the first circumferential direction; and,
  the second locking feature is arranged to slide along the first locking feature without non-rotatably connecting to the first locking feature.

* * * * *